Nov. 10, 1925.

Re. 16,210

A. E. WILLIAMS

DRILL HEAD

Original Filed Feb. 28. 1924

Inventor:
Alfred E. Williams,
by Calvin H. Calver,
Att'ys.

Reissued Nov. 10, 1925.

Re. 16,210

UNITED STATES PATENT OFFICE.

ALFRED E. WILLIAMS, OF COPPER HILL, ARIZONA.

DRILL HEAD.

Original No. 1,498,598, dated June 24, 1924, Serial No. 695,874, filed February 28, 1924. Application for reissue filed May 18, 1925. Serial No. 31,239.

*To all whom it may concern:*

Be it known that I, ALFRED E. WILLIAMS, a citizen of the United States, residing at Copper Hill, in the county of Gila and State of Arizona, have invented or discovered certain new and useful Improvements in Drill Heads, of which the following is a specification, reference being had therein to the accompanying drawing.

In the use of that class of pneumatic drilling machines known as stope hammer machines the front heads, which are usually of cast metal, and in which the drills work, become so badly worn, interiorly, after about thirty days' use, that they have to be replaced by new heads at considerable expense. The present invention has for its object to lessen this expense and thus extend the working life of the drill heads by providing the same with spring steel bushings which are inserted in such a manner that they are securely fixed in place, for the working operation; but which, when they become somewhat worn, may be removed and replaced by new bushings, all as will hereinafter more fully appear.

Figure 1:
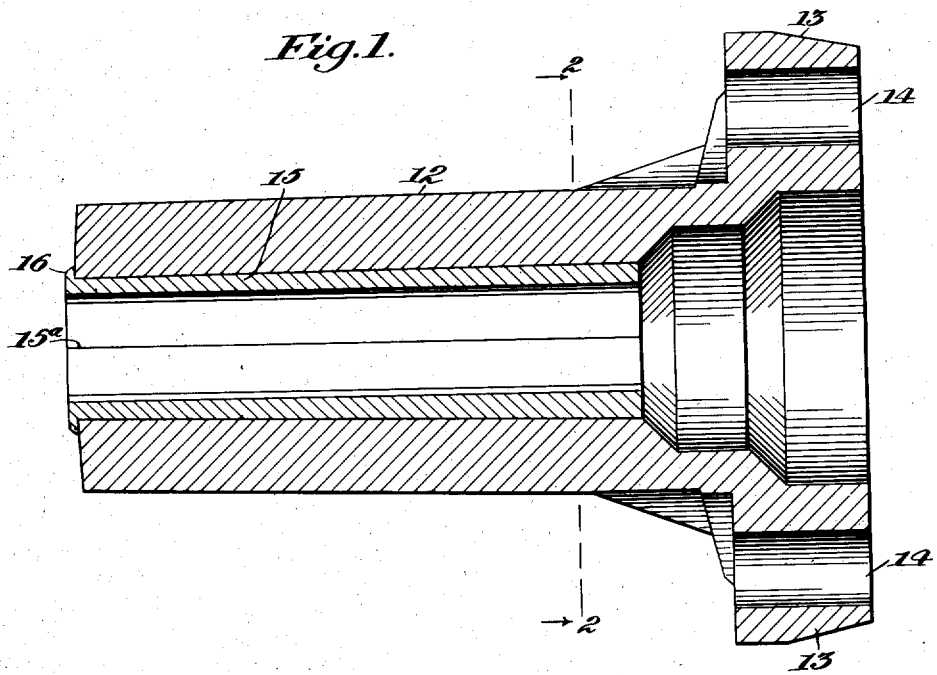
Figure 2:
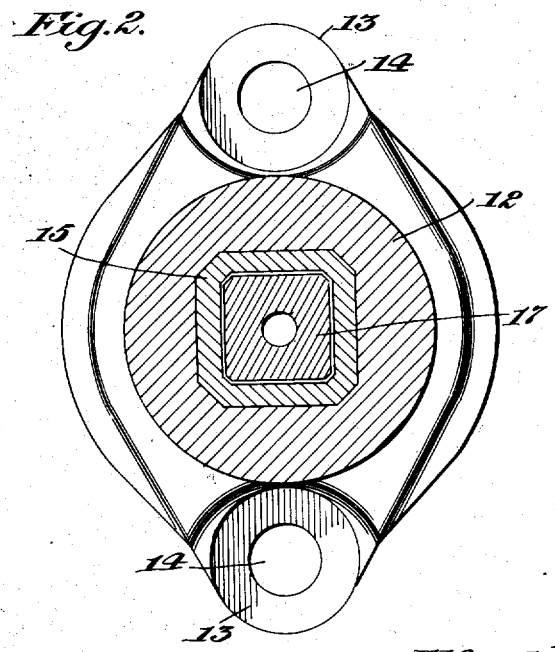

In the accompanying drawing Fig. 1 is a longitudinal section of a stope hammer drill head embodying the present invention, and Fig. 2 is a cross section of a slightly different form of the same on line 2—2, Fig. 1, showing a drill of well known construction in place in the head.

Referring to the drawing, 12 denotes a drill head of well known form, the same being provided with ears 13 having bolt holes 14 to enable it to be attached to the body of the machine. Within this drill head is a bushing 15 made from spring steel worked out at a cherry red or low heat under a hammer, so that it becomes very tough, thus enabling it to wear well in use. The bushing 15 may be split longitudinally, as indicated by the line $15^a$, or may be integral as shown in Fig. 2. The central opening of the drill head which receives this bushing, or the bushing itself, is slightly tapered to the extent of about $\frac{1}{8}$ or $\frac{3}{32}$ of an inch for the usual length (about five inches) of that part of the drill head which receives the bushing, and the bushing is driven through the drill head from the inside until it protrudes or projects slightly from the outer end, and this protruding or projecting part is then upset or hammered down forming a bead 16 which securely holds the bushing in place. When, however, the bushing is to be removed, this protruding or projecting end and the bead 16 may be filed or ground off, or otherwise cut away, and the bushing may then be removed by being driven backward through the head. It may be noted that if the spring steel bushing is split longitudinally in driving it into the head it will be tightly closed, as will be understood from the drawing.

In the drawing the opening in the drill head is shown as being slightly tapered, so that the bushing 15 may be readily driven in and out of the head, but a similar result may be attained by tapering the bushing, as will be understood.

In the use of these stope hammer drills the drill itself is of non-circular form and is slightly turned, at intervals, by the operative who grasps a handle with which the machine is usually provided, this turning of the drill being a large factor in causing the wear above referred to. In the present case a usual form of square drill 17 is shown, with chamfered-off corners, and the bushing is of corresponding shape in cross section, but it will be understood that whatever the non-circular form of the drill may be the bushing will be shaped to correspond.

A worn drill head may be provided with a bushing such as is above described at a cost which is only a fractional part of what it would cost to replace the worn drill head by a new one; and a worn drill head which has been bushed, as described, will wear longer, by some two or three weeks, than the original drill head.

Having thus described my invention I claim and desire to secure by Letters Patent:

1. A front drill head, for a stope hammer machine, provided with a split, spring steel bushing fitting tightly in said head and having a slightly protruding end which is upset to form a bead to hold the bushing in place, but which bead may be cut away to enable the bushing to be driven out of the head when desired.

2. A front drill head, for a stope hammer machine, provided with an opening therethrough, combined with a split, spring steel bushing fitting tightly in said opening, and having a slightly protruding end which is upset to form a bead to hold the bushing in place, but which bead may be cut away to enable the bushing to be driven out of the head when desired, the contacting portions of one of said parts being slightly tapered so that said bushing may be driven tightly in said head and may be readily driven out when said bead is removed.

3. A front drill head, for a stope hammer machine, provided with a slightly tapered opening therethrough, combined with a split, spring steel bushing fitting tightly in said opening and having a slightly protruding end which is upset to form a bead to hold the bushing in place, but which bead may be cut away to enable the bushing to be driven out of the head when desired, so that said bushing may be driven tightly in said head and may be readily driven out when said bead is removed.

4. A front drill head, for a stope hammer machine, provided with an opening therethrough, combined with a steel bushing fitting tightly in said opening and having a slightly protruding end which is upset to form a bead to hold the bushing in place, but which bead may be cut away to enable the bushing to be driven out of the head when desired, the contacting portions of one of said parts being slightly tapered so that said bushing may be driven tightly in said head and may be readily driven out when said bead is removed.

5. A front drill head, for a stope hammer machine, provided with a slightly tapered opening therethrough, combined with a steel bushing fitting tightly in said opening and having a slightly protruding end which is upset to form a bead to hold the bushing in place, but which bead may be cut away to enable the bushing to be driven out of the head when desired, so that said bushing may be driven tightly in said head and may be readily driven out when said bead is removed.

In testimony whereof I affix my signature.

ALFRED E. WILLIAMS.